May 22, 1956     A. B. WARRELL     2,746,201

INSECT GUARD FOR TREES

Filed Jan. 23, 1953

INVENTOR
ALBERT B. WARRELL
BY Charles S. Evans
his ATTORNEY

United States Patent Office 2,746,201
Patented May 22, 1956

2,746,201
INSECT GUARD FOR TREES
Albert B. Warrell, Palo Alto, Calif.

Application January 23, 1953, Serial No. 332,926

2 Claims. (Cl. 43—108)

My invention relates to tree protectors; and more particularly to a device constituted of two similar parts, for protecting trees from crawling insects such as ants.

One of the objects of my invention is the provision of a guard which is adjustable to different sizes of trees.

Another object of my invention is the provision of an insect guard which can be formed in long continuous strips and cut to size as needed on the job.

Still another object is the provision of an insect guard for trees which is simple and economical to manufacture, and quickly and easily applied.

The invention possesses other objects, some of which with the foregoing will be brought out in the following description of the invention. I do not limit myself to the showing made by the said description and the drawings, since I may adopt variant forms of the invention within the scope of the appended claims.

Referring to the drawings.

Almost every home owner that has trees on his property has been plagued at certain seasons of the year by masses of crawling insects such as ants, which migrate from the ground into the trees. To protect the trees from these insects, various protective devices of different design have been used. Some are effective, but many are too expensive and unadaptable for wide application to different sizes of trees.

The two-part insect guard of my invention fulfills the need of a protective device which is economical to manufacture, easy to apply to different sizes of trees, and which is effective against crawling insects.

Broadly, the insect guard of my invention comprises a couple of strips of conformable material of sufficient length to girdle a tree trunk, and used together on a single tree. Each strip comprises waist and skirt portions, the waist portion of which, when applied to a tree, snugly embraces the trunk, while the skirt portion arranges itself to provide a conical surface surrounding the tree and extending angularly therefrom. One of the strips is characterized by a wider skirt than the other, and in use, the wider strip is placed above and the narrower strip below, so that as shown in Fig. 1, the upper strip overhangs and protects from rain, the lower strip which provides an annular receptacle for poison.

Gasket means are preferably interposed between the waist portion and the tree trunk to insure a snug engagement. The waist portion, either with or without the gasket is held on the tree by suitable tie means therearound. Because the component parts of each strip, when in use, lie in intersecting but not planar surfaces, means are provided for permitting the parts to respond to the conditions which embracing a tree trunk imposes. Such means may be supplied by cuts or by fold lines.

Figure 1:
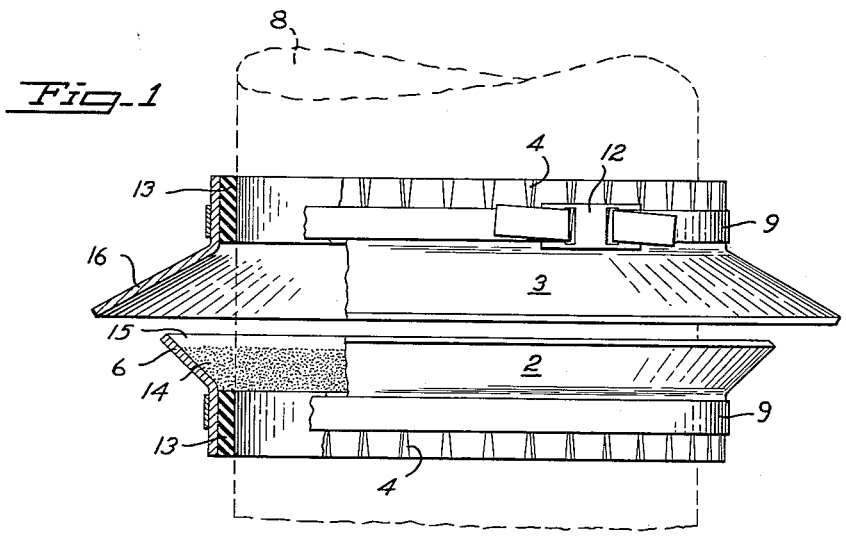
Fig. 1 is an elevation showing the two-member insect guard applied to a tree trunk which is indicated in dash lines. A portion of the device has been broken away to disclose the underlying structure.
Figure 2:
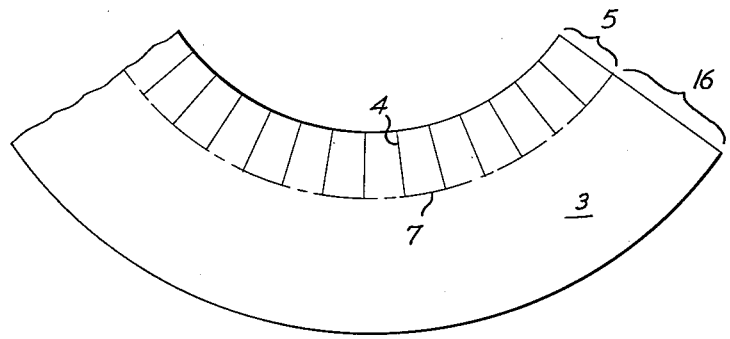
Fig. 2 is a plan view showing a portion of the upper member of the insect guard in its extended strip condition before application to a tree trunk. The score line which patterns the folding is shown as a broken line.

More specifically, and referring now to the drawings, one embodiment of my invention comprises a couple of arcuate strips 2 and 3, Fig. 1, of a conformable material such as a heavy hard finish card or paper which has preferably been treated so as to be water resistant. Each strip is provided adjacent its shorter circumference with a plurality of radial cuts 4 of equal length, defining a waist portion or zone 5, which adjoins the connected skirt portion 6. A scored arcuate line 7 separates the two portions or zones and provides means by which the waist portion folds up so that it will conform to the shape of the tree to which it is applied.

Thus it will be seen in Fig. 1, that wrapping the strip about a tree trunk 8 results in the waist portion snugly embracing the tree trunk, while the skirt portion provides a truncated conical surface thereabout.

As seen in Fig. 1, the strip is secured in place by suitable tie means such as a binding strap 9, preferably a bendable strap of metal, with the ends of the strap passing through slots in a plate buckle 12. A rubber gasket 13, interposed between the waist portion of the strip and the tree trunk prevents slippage and also leakage of insect poison 14. The poison is preferably in powdered form, and is placed in the generally annular receptacle 15, between the skirt of the lower strip 2 and the tree trunk.

A second strip 3, with a wider skirt 16 is placed in inverted position on the tree trunk above the first strip to shield the receptacle from rain and falling leaves.

The arcuate strips are long enough and have a radius such that the ends will overlap when placed on trees within the range of the smaller diameters usually found around the home. Practically, it is found that the strips may be cut in the shape of an annulus, say 3½ inches inside diameter and 6½ inches outside diameter. When split this annular strip will fit trees with trunks 3 inches in diameter or less and may be cut into 2 or even 3 additional pieces.

Figure 3:
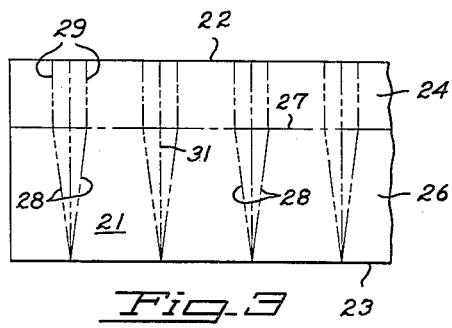
Fig. 3 is a plan view of the upper member of a variant form of strip in its extended condition. The score lines which pattern the folding are shown in broken lines.
Figure 4:
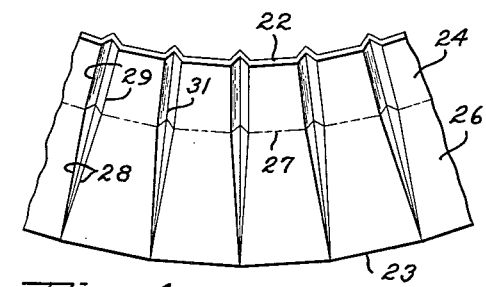
Fig. 4 is a plan view of the modified strip of Fig. 3, shown partially folded to condense or shorten the structure.

In Figs. 3 and 4, I show a variant form of guard, having greater adjustability and cutting from stock with less waste. This guard is formed from a long continuous strip 21, having parallel side edges 22 and 23, and divided longitudinally into parallel waist and skirt zone portions 24 and 26. The zones are separated by a scored fold line 27.

Spaced along the strip at short intervals are a plurality of sets of scored fold lines, which extend the full width of the strip. The fold lines 28, scored into the skirt portion, diverge from the long edge 23 of the skirt portion until they intersect the longitudinal fold line 27, at which point they continue across the waist portion as two spaced parallel fold lines 29 until they intersect the opposite edge 22. Another fold line 31, is provided which extends perpendicularly across the strip in a line bisecting the angle formed by the lines 28 in the skirt portion, and equally spaced between and parallel to the lines 29 in the waist portion.

Thus it will be seen by examination of Fig. 4 wherein the strip is shown partly folded, that each set of fold lines reduces the length of the waist portion 24 by an amount equal to the space between the lines 29, while the edge 23 remains the same length.

Folding of the strip in this manner results in the skirt portion providing a generally annular conical surface, while the waist portion will assume a generally cylindrical shape at an angle to the skirt portion. Application of the strip to a tree trunk and securement thereto, along with the gasket 13, is accomplished as previously described by use of a binding strap 9.

I claim:

1. An insect guard for trees, comprising a couple of flat continuously straight strips, each strip having a waist portion having a plurality of sets of triplicate fold lines extending thereacross and a skirt portion having convergent fold lines continuous with the waist fold lines, the skirt portion of one of the strips being longer than the skirt portion of the other strip of the couple, readily deformable gasket material disposable on the inside surface of the waist portion of each strip, and tie means for binding the gasketed waist portions of the strips about a tree trunk in closely spaced relation with the long skirt of one strip overhanging the short skirt of the other strip.

2. An insect guard for trees, comprising a flat continuously straight strip of thin flexible material, a fold line extending longitudinally of the strip parallel to a long edge and dividing the strip into a waist portion and a skirt portion, said waist portion having a plurality of sets of triplicate fold lines extending thereacross, said skirt portion having convergent fold lines continuous with the waist fold lines and extending across the skirt, and tie means for binding the folded waist portion about a tree trunk.

References Cited in the file of this patent

UNITED STATES PATENTS

| | | |
|---|---|---|
| 523,682 | Noone | July 31, 1894 |
| 730,575 | Schirra | June 9, 1903 |
| 1,674,118 | Merrick | June 19, 1928 |
| 2,261,360 | Gerendas | Nov. 4, 1941 |

FOREIGN PATENTS

| | | |
|---|---|---|
| 802,666 | Germany | Feb. 19, 1951 |